United States Patent
Brassell et al.

(10) Patent No.: US 6,739,301 B2
(45) Date of Patent: *May 25, 2004

(54) COMPOSITE INTAKE MANIFOLD ASSEMBLY FOR AN INTERNAL COMBUSTION ENGINE AND METHOD FOR PRODUCING SAME

(75) Inventors: David Brassell, Walled Lake, MI (US); Archie Hoebecke, II, Brighton, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/271,862

(22) Filed: Oct. 16, 2002

(65) Prior Publication Data

US 2003/0079707 A1 May 1, 2003

Related U.S. Application Data

(63) Continuation of application No. 09/862,970, filed on May 22, 2001, now Pat. No. 6,467,449.

(51) Int. Cl.⁷ ............................................... F02M 35/10
(52) U.S. Cl. ........................... 123/184.61; 123/184.34; 123/184.47; 264/241
(58) Field of Search ...................... 123/184.34, 184.31, 123/184.47, 184.61; 264/241

(56) References Cited

U.S. PATENT DOCUMENTS 5,575,249 A * 11/1996 Mielke et al. ......... 123/184.57
5,636,605 A * 6/1997 Nomizo et al. ........ 123/184.61
5,853,831 A * 12/1998 Urabe et al. ............... 428/35.7

* cited by examiner

Primary Examiner—Noah P. Kamen
(74) Attorney, Agent, or Firm—MacMillan, Sobanski & Todd, LLC

(57) ABSTRACT

A composite air intake manifold assembly adapted for use with an internal combustion engine includes an upper half shell formed from a polymer, a lower half shell formed from a polymer and joined to the upper half shell to define a housing having an internal cavity, and a one piece inner shell formed from a polymer and disposed within the cavity. The one piece inner shell in combination with the upper half shell and the lower half shell cooperate to define at least a pair of spaced apart air intake runners. Each of the runners includes an opened air intake end adapted to receive atmospheric air, and an opened air inlet end adapted to be connected to an associated air inlet side of a cylinder head of the internal combustion engine. The method for producing the composite air intake manifold assembly includes the steps of: (a) providing an upper half shell formed from a polymer; (b) providing a lower half shell formed from a polymer; (c) providing a one piece inner shell formed from a polymer; (d) disposing the one piece inner shell in one of the lower half shell and the upper half shell; (e) subsequent to step (d), joining the one piece inner shell to the one of the lower half shell and the upper half shell; and (f) joining the one piece inner shell to the other one of the lower half shell and the upper half shell to thereby produce the composite air intake manifold assembly, wherein the one piece inner shell in combination with the upper half shell and the lower half shell cooperate to define at least a pair of spaced apart air intake runners, each of the runners including an opened air intake end, adapted to receive atmospheric air, and an opened air inlet end, adapted to be connected to an associated air inlet side of a cylinder head of the internal combustion engine.

14 Claims, 16 Drawing Sheets

COMPOSITE INTAKE MANIFOLD ASSEMBLY FOR AN INTERNAL COMBUSTION ENGINE AND METHOD FOR PRODUCING SAME

This application is a continuation of application Ser. No. 09/862,970, filed May 22, 2001, now U.S. Pat. No. 6,467,449.

BACKGROUND OF THE INVENTION

This invention relates in general to vehicle engines and in particular to an improved composite intake manifold assembly for use in such a vehicle engine and method for producing the same.

An intake manifold assembly of a multi-cylinder engine includes a plurality of branched air passageways or ducts. Each of the air passageways defines a generally tubular runner having an air intake port and an opposite air inlet port. The air intake port of the runner is connected to an associated plenum which supplies atmospheric, turbo, or supercharged air to the runner intake port, and the air inlet port is connected to a flange which is connected to an associated inlet port of each cylinder head of the engine to supply the air from the runner to each cylinder head. Conventional intake manifold assemblies are constructed of cast iron, magnesium, aluminum, and plastic.

A typical aluminum intake manifold assembly is produced entirely by conventional casting process. These manifolds typically include a plurality of tubes disposed having first ends connected with the outlet holes of an air intake plenum, and second opposite ends connected with the associated holes of a flange member which is adapted for mounting to a cylinder head of the engine. Since the tubes are usually U-shaped, the manifold cannot be cast in one piece but rather must be cast in two sections, with one section comprising a length of the tubing cast integrally with the plenum and the other section comprising the remaining length of the tubing cast integrally with the flange member. The halves must then be joined together with bolts and a gasket or other suitable hardware to complete the manifold, further adding to the cost and complexity of the manifold.

A typical plastic multi-piece manifold assembly includes an upper half shell and a lower half shell which are joined together by a welding process. In some instances the plastic multi-piece manifold assembly includes one or more inner shell pieces which are disposed within the upper and/or lower half shells. The inner shell can be lower partial inserts which are secured to lower half shell; upper partial inserts which are secured to the upper half shell, or both lower and upper partial inserts which are secured to the respective lower and upper half shells. The inserts are typically joined to the associated half shell by a conventional heat staking process or welding process. In some instances, a plurality of individual blow molded tubes are disposed within the upper and lower half shells and joined thereto by a conventional heat staking process. In both types of constructions, the inserts or the inserts in cooperation with upper or lower half shells define a corresponding number of runner paths through which air is supplied to the associated cylinder head of the engine.

SUMMARY OF THE INVENTION

This invention relates to an improved composite air intake manifold assembly adapted for use with an internal combustion engine and method for producing the same. The composite air intake manifold assembly includes an upper half shell formed from a polymer, a lower half shell formed from a polymer and joined to the upper half shell to define a housing having an internal cavity, and a one piece inner shell formed from a polymer and disposed within the cavity. The one piece inner shell in combination with the upper half shell and the lower half shell cooperate to define at least a pair of spaced apart air intake runners. Each of the runners includes an opened air intake end adapted to receive atmospheric air, and an opened air inlet end adapted to be connected to an associated air inlet side of a cylinder head of the internal combustion engine. The method for producing the composite air intake manifold assembly includes the steps of: (a) providing an upper half shell formed from a polymer; (b) providing a lower half shell formed from a polymer; (c) providing a one piece inner shell formed from a polymer; (d) disposing the one piece inner shell in one of the lower half shell and the upper half shell; (e) subsequent to step (d), joining the one piece inner shell to the one of the lower half shell and the upper half shell; and (f) joining the one piece inner shell to the other one of the lower half shell and the upper half shell to thereby produce the composite air intake manifold assembly, wherein the one piece inner shell in combination with the upper half shell and the lower half shell cooperate to define at least a pair of spaced apart air intake runners, each of the runners including an opened air intake end, adapted to receive atmospheric air, and an opened air inlet end, adapted to be connected to an associated air inlet side of a cylinder head of the internal combustion engine. The one piece inner shell of the air intake manifold assembly of this invention can be formed for a variety of different vehicle engine applications. As a result of this, various runner lengths and plenum volumes of the air intake manifold assembly can be attained by only modifying the one piece inner shell of the present invention.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
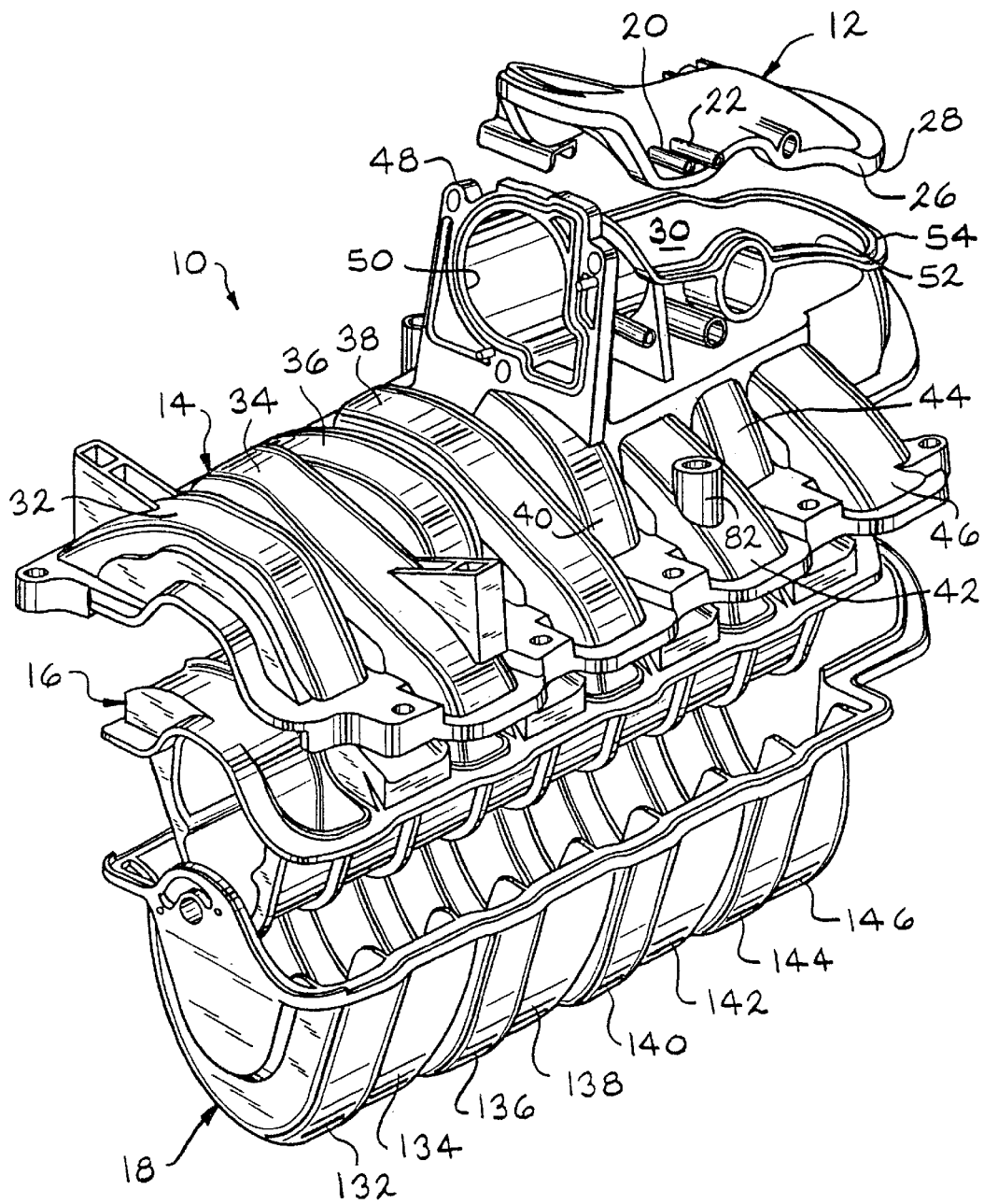
FIG. 1 is a perspective view of a first embodiment of a composite intake manifold assembly constructed in accordance with the present invention.

Referring now to the drawings, there is illustrated in FIG. 1 a perspective view of a first embodiment of a composite air intake manifold assembly, indicated generally at 10, in accordance with the present invention. The composite intake manifold assembly 10 shown in this embodiment is for use with a V-8 engine and includes a cover 12, an upper half shell 14, a one piece "full" inner shell or insert 16, and a lower half shell 18. As will be discussed below, the cover 12, the upper half shell 14, the one piece inner shell 16, and the lower half shell 18 are joined together and sealed by a suitable process to produce the composite intake manifold assembly 10 in accordance with this invention.

Preferably, the process used to form the composite intake manifold assembly 10 of this invention is a welding process. More preferably, the welding process is a linear vibration welding process. However, other suitable welding process which are operative to "heat" the surfaces causing the melting and/or fusing together of the surfaces can be used if desired. Preferably, such welding processes cause heat at the associated surfaces to create friction therebetween and cause the surfaces to be joined together by melting and/or fusing. However, welding processes which do not create friction between the adjacent surfaces but which are still effective to create heat between the surfaces to join them together can be used. For example, suitable friction welding processes can include an ultrasonic welding process, a non-linear vibration welding process, and a hot plate welding process; suitable non-friction welding processes can include laser or infrared processes. In addition, as will be discussed below, different processes can be used for the joining Of the components-of the air intake manifold assembly 10 of this invention and the sealing of the components thereof.

Preferably, the cover 12, the upper half shell 14, the one piece inner shell 16, and the lower half shell 18 of the composite intake manifold assembly 10 are all formed of the same material. Such a suitable material is a glass reinforced nylon. Alternatively, other suitable materials can be used and/or the materials of one or more of the cover 12, the upper half shell 14, the one piece inner shell 16, and the lower half shell 18 can be different than the others. For example, other suitable materials can include unreinforced nylon and mineral reinforced nylon. Although the composite intake manifold assembly 10 illustrated and described herein is for use with a V-8 engine application, it will be appreciated that the invention can be used in conjunction with other types of engines. For example, the composite manifold assembly can be used in connection with an inline 4 cylinder engine (I-4), an inline 6 cylinder engine (I-6), and a V-6 cylinder engine.

Figure 7:
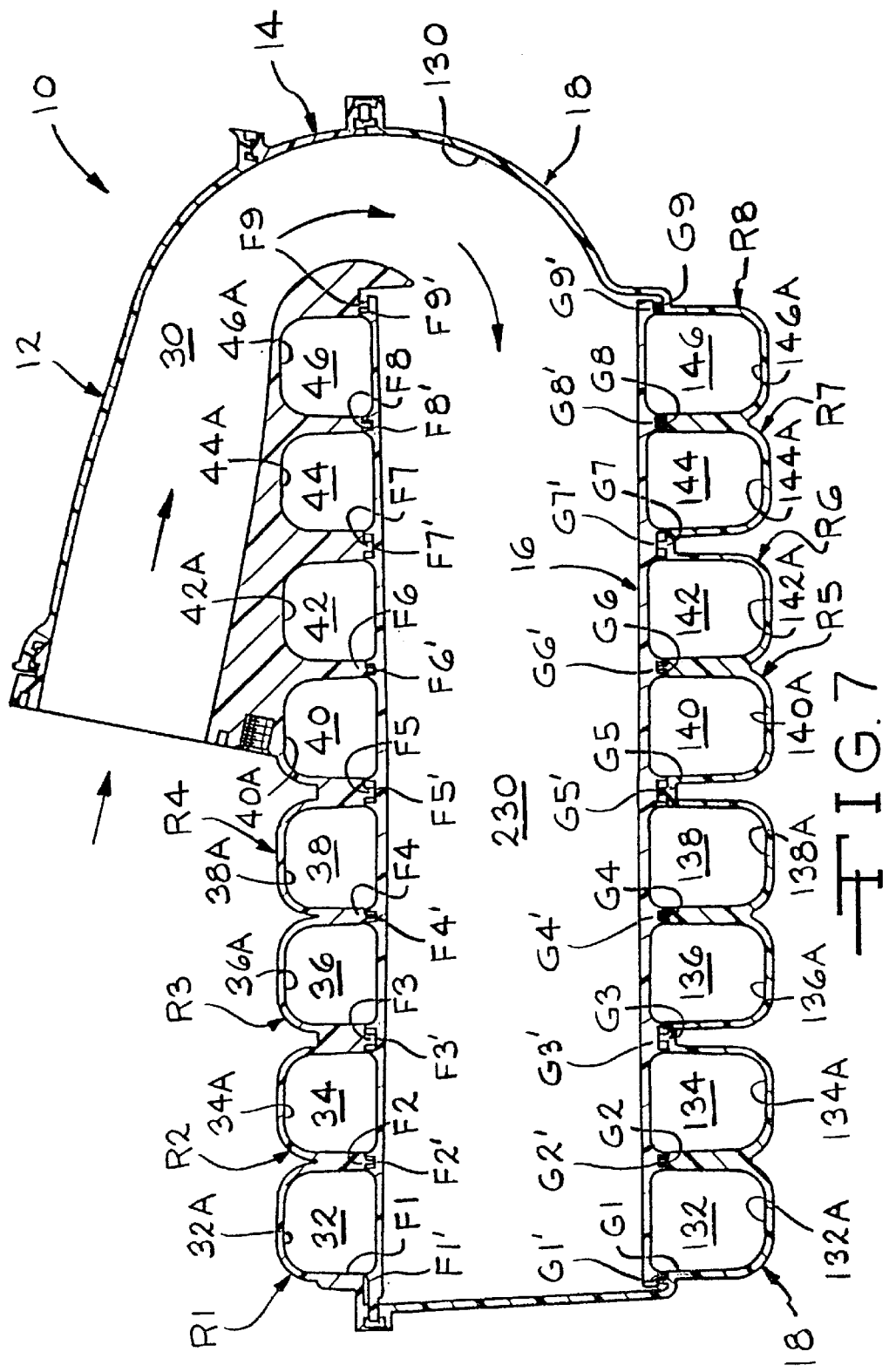
FIG. 7 is a sectional view of the composite intake manifold assembly taken along line 7—7 of FIG. 6.

As shown in FIG. 1, the cover 12 is a molded cover formed from a suitable plastic material and includes a plurality of integrally molded in place vacuum taps (two of such taps illustrated in this embodiment at reference numbers 20 and 22). The cover 12 includes an outer peripheral edge 26 which defines an underside insertion or connecting flange 28. Alternatively, the shape and/or the structure of the cover 12 can be other than illustrated depending upon the particular structure of the associated intake manifold assembly. The upper half shell 14 is a one piece molded half shell formed from a polymer material and includes a plenum or air intake chamber 30 and eight generally tubular shaped upper runners 32, 34, 36, 38, 40, 42, 44, and 46. Each of the runners 32, 34, 36, 38, 40, 42, 44, and 46 includes a respective generally arch like inner surface 32A, 34A, 36A, 38A, 40A, 42A, 44A, and 46A, shown in FIG. 7, which defines an associated upper runner inner wall surface.

The upper half shell 14 includes a flange 48 having an opening 50 formed therein. The flange 48 is adapted to be connected to a throttle body (not shown) and the opening 50 functions as an air intake port to supply atmospheric air to the plenum 30. The upper half shell 14 further includes an opening 52 which generally corresponds to the profile of the flange 28 of the cover 12. The opening 52 defines a receiving flange 54 which is adapted to receive the insertion flange 28 of the cover 12 in a mating relationship therewith. Alternatively, the cover 12 could be eliminated and the upper half shell 14 could include an integrally molded cover (not shown).

Figure 2:
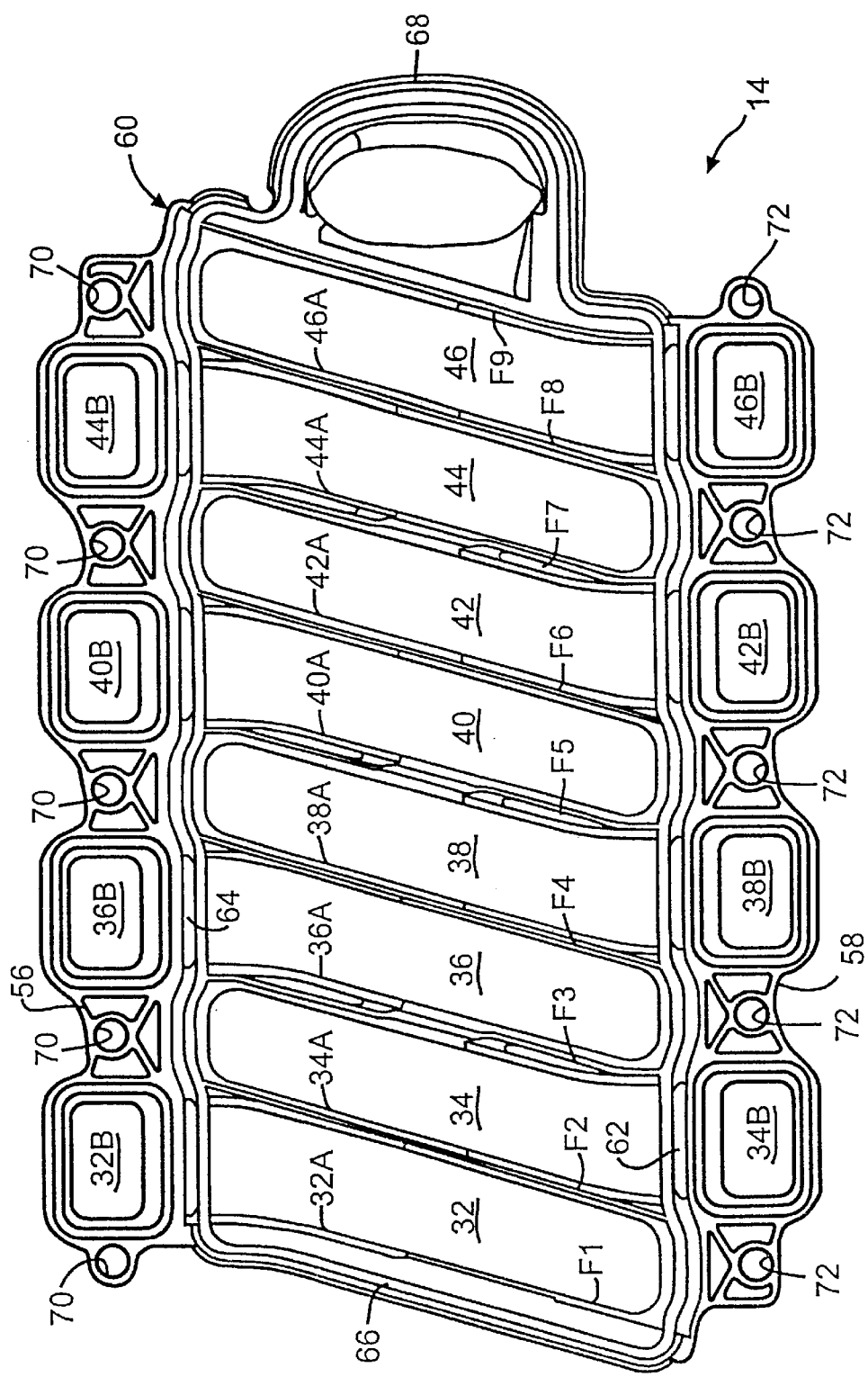
FIG. 2 is a plan view of an upper half shell used in the composite intake manifold assembly illustrated in FIG. 1.

The upper half shell 14 includes an outer peripheral edge 60 which defines a pair of opposed side flanges 56 and 58 and a pair of opposed end flanges 66 and 68, best shown in FIG. 2. The side flange 56 includes five mounting holes 70, and the side flange 58 includes five mounting holes 72. As will be discussed below, the mounting holes 70 and 72 are adapted to receive a suitable fastener (not shown) for securing the composite intake manifold assembly 10 to a flange (not shown) of the cylinder heads (not shown) of an engine (not shown) thereby connecting each of the runners of the manifold assembly to a respective inlet of each cylinder head.

Figure 2A:
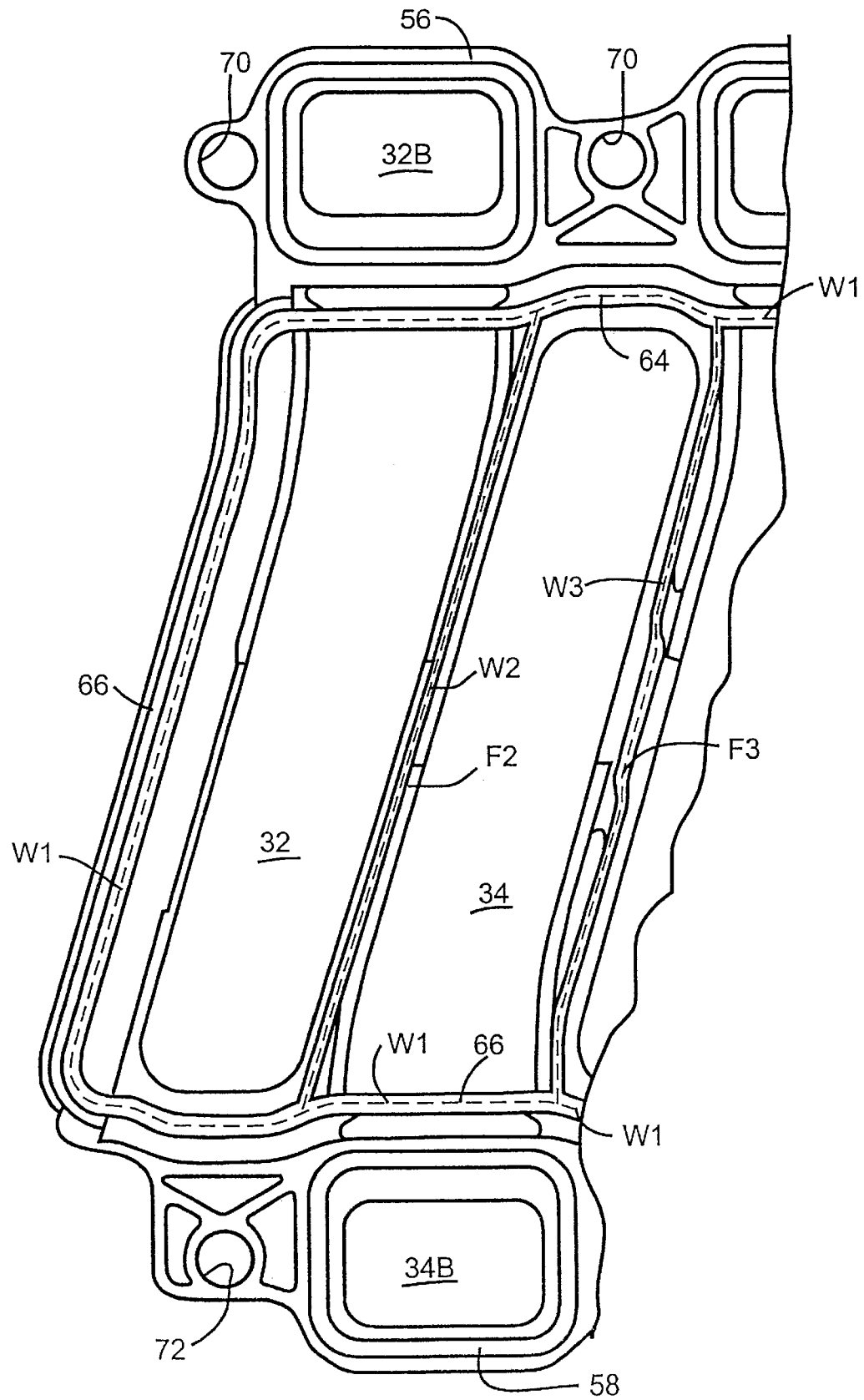
FIG. 2A is an enlarged plan view of a portion of the upper half shell shown in FIG. 2.

The upper half shell 14 further includes a pair of side flanges 62 and 64 which are spaced inwardly relative to side flanges 56 and 58, respectively. As will be discussed below, the side flanges 62 and 64 and the end flanges 66 and 68 cooperate to define a continuous welding periphery or border around the edge 60 of the upper half shell 14 (partially shown in FIG. 2A by dashed line W1), for securing the upper half shell 14 to the one piece inner shell 16. The upper half shell 14 further includes a plurality of receiving flanges F1–F9, shown in FIG. 2. As will be discussed below, each of the receiving flanges F1–F9 of the upper half shell 14 are adapted to receive an associated one of a plurality of insertion flanges provided on the one piece inner shell 16.

Figure 6:
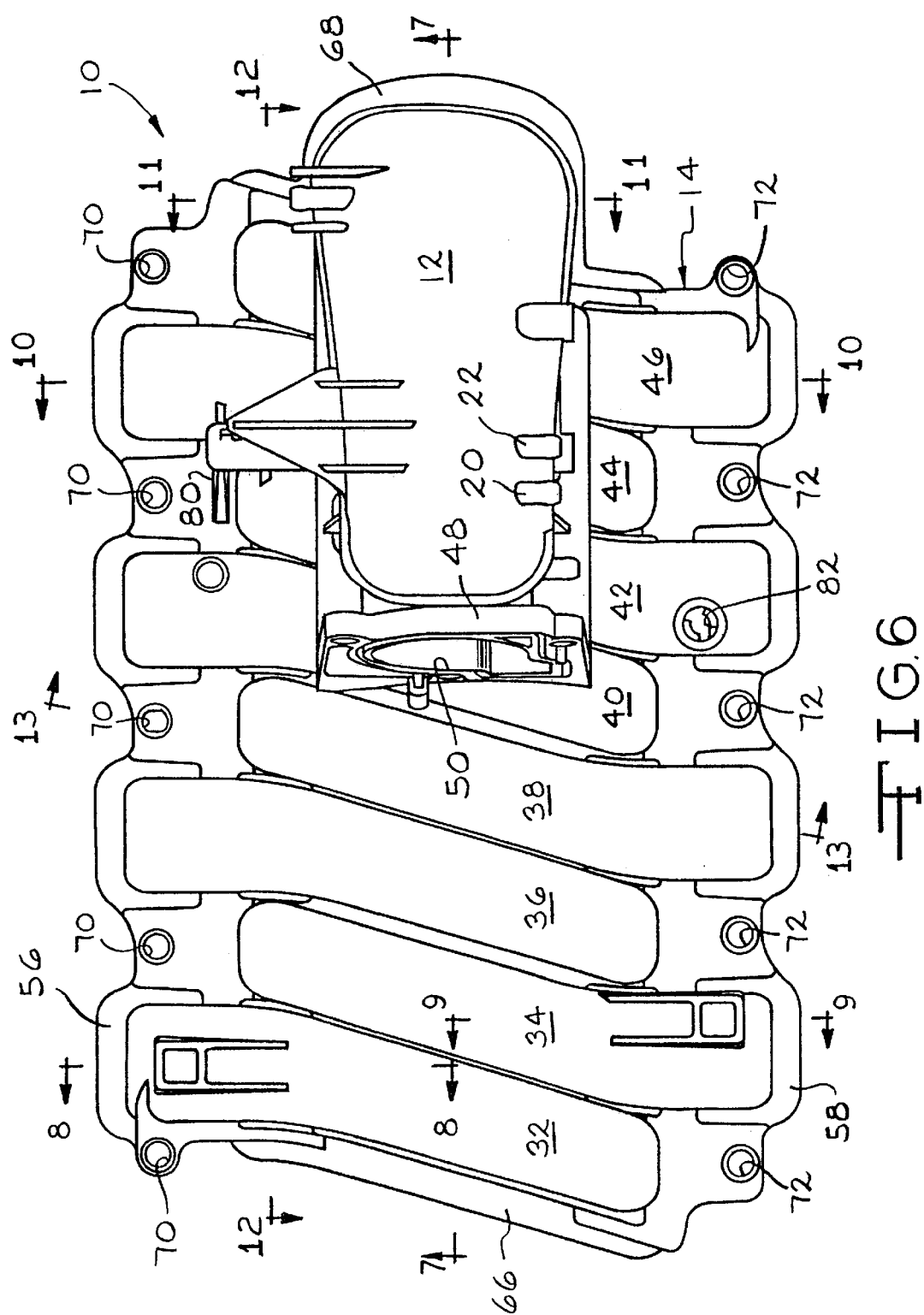
FIG. 6 is a sectional view of the composite intake manifold assembly illustrated in FIG. 1.
Figure 12:
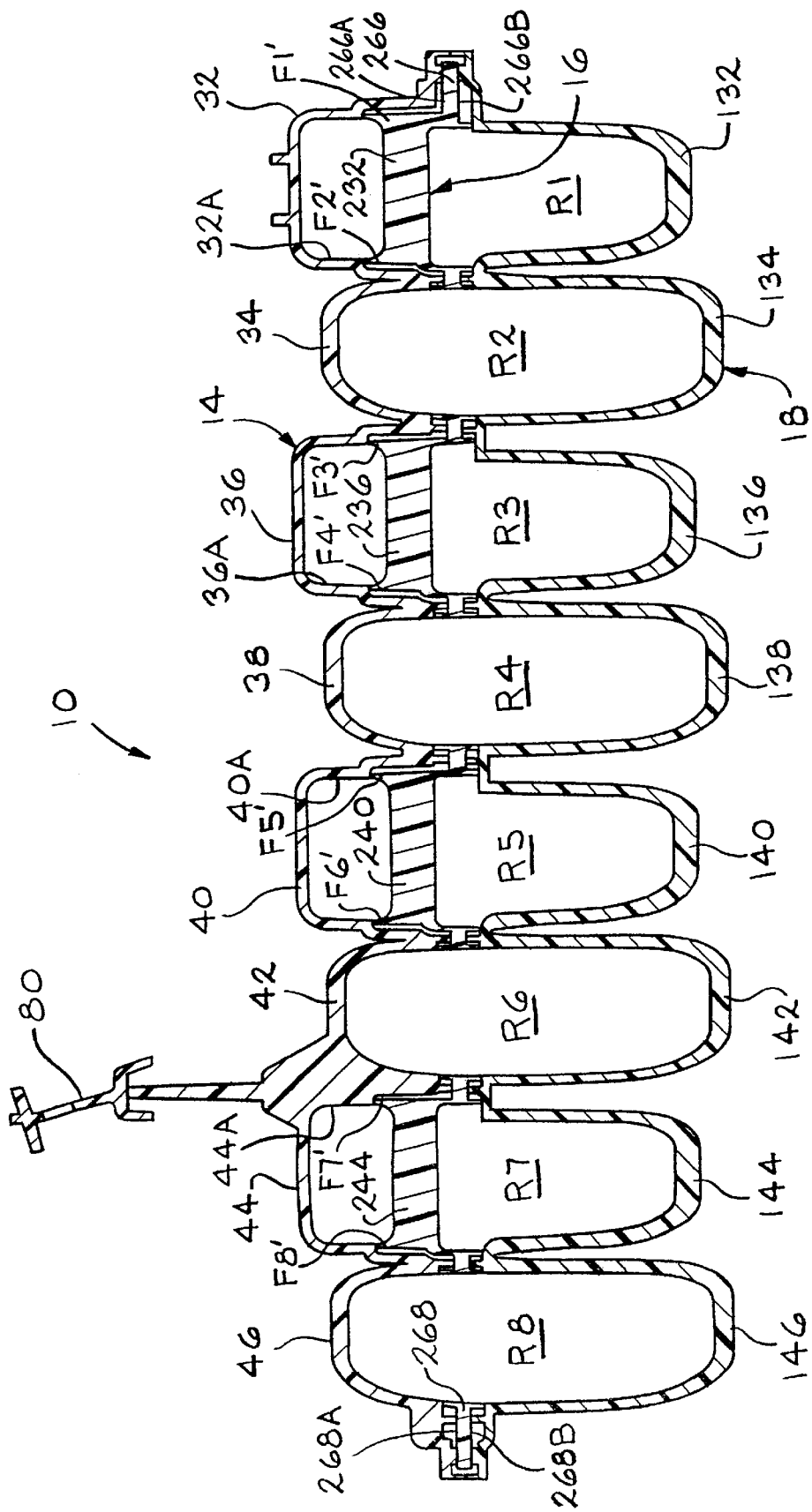
FIG. 12 is a sectional view of the composite intake manifold assembly taken along line 12—12 of FIG. 6.

In the illustrated embodiment, the upper half shell 14 further includes an integrally molded in place mounting bracket 80 (shown in FIGS. 6 and 12), and an integrally molded in place threaded sensor fitting connection 82 (shown in FIGS. 6 and 12). The mounting bracket 80 is adapted to secure throttle and cruise control cables (not shown) thereto. In the illustrated embodiment, the sensor fitting connection 82 is adapted to secure a charge air temperature (CAT) fitting with a turn and lock retaining feature.

The upper half shell 14 further includes eight air inlet ports 32B, 34B, 36B, 38B, 40B, 42B, 44B, and 46B. As will be discussed below, the air inlet ports 32B, 34B, 36B, 38B, 40B, 42B, 44B, and 46B are adapted to be connected to an associated inlet port of each cylinder head of the engine to supply the air from a respective one of the runners to an associated cylinder. The lower half shell 18 is a one piece molded half shell formed from a polymer material and includes eight generally tubular shaped upper runners 132, 134, 136, 138, 140, 142, 144, and 146. Each of the runners 132, 134, 136, 138, 140, 142, 144, and 146 includes a respective arch like inner surface 132A, 134A, 136A, 138A, 140A, 142A, 144A, and 146A, shown in FIG. 7, which define an associated lower runner inner wall surface.

Figure 3:
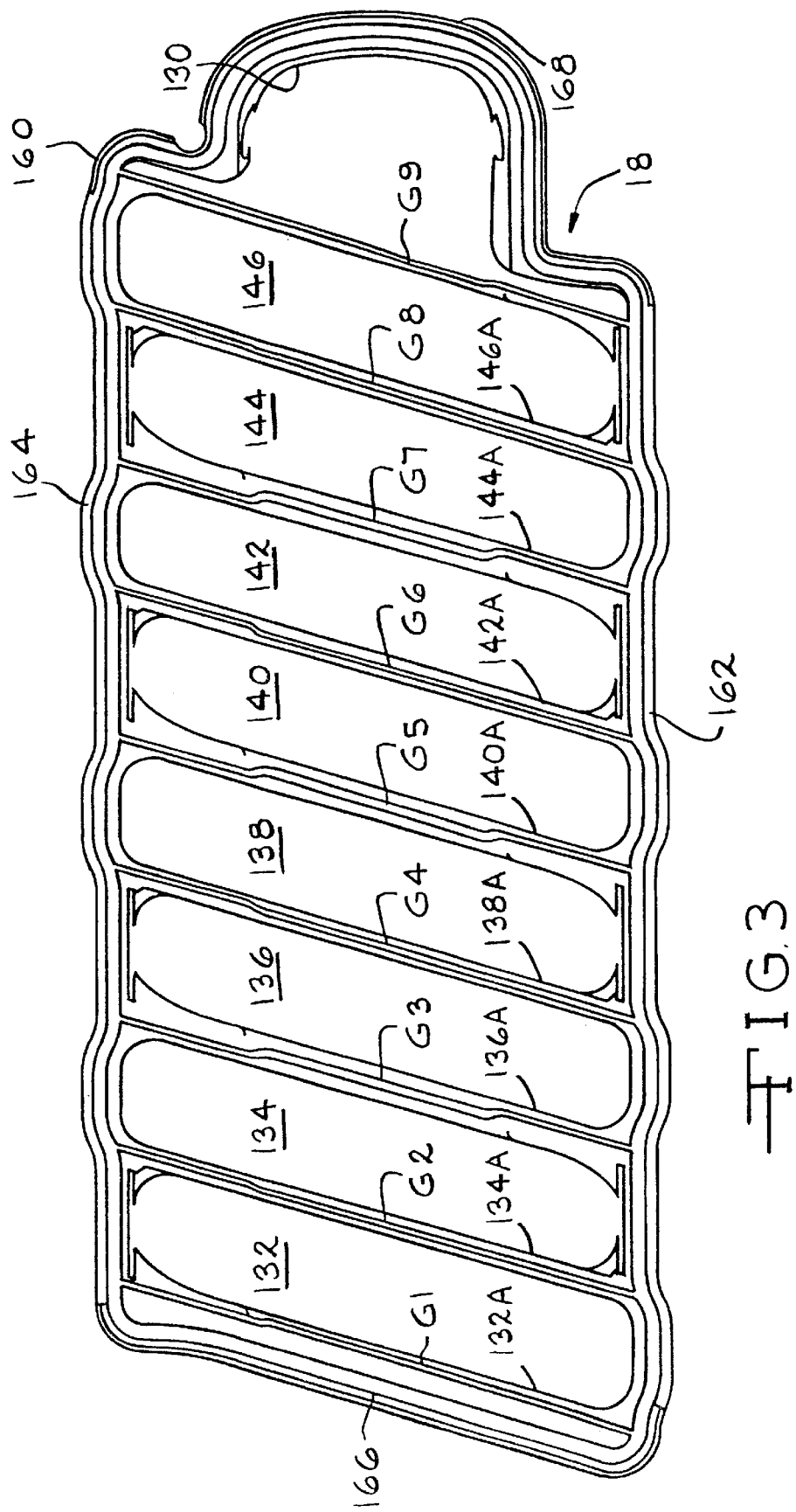
FIG. 3 is a plan view of a lower half shell used in the composite intake manifold assembly illustrated in FIG. 1.
Figure 3A:
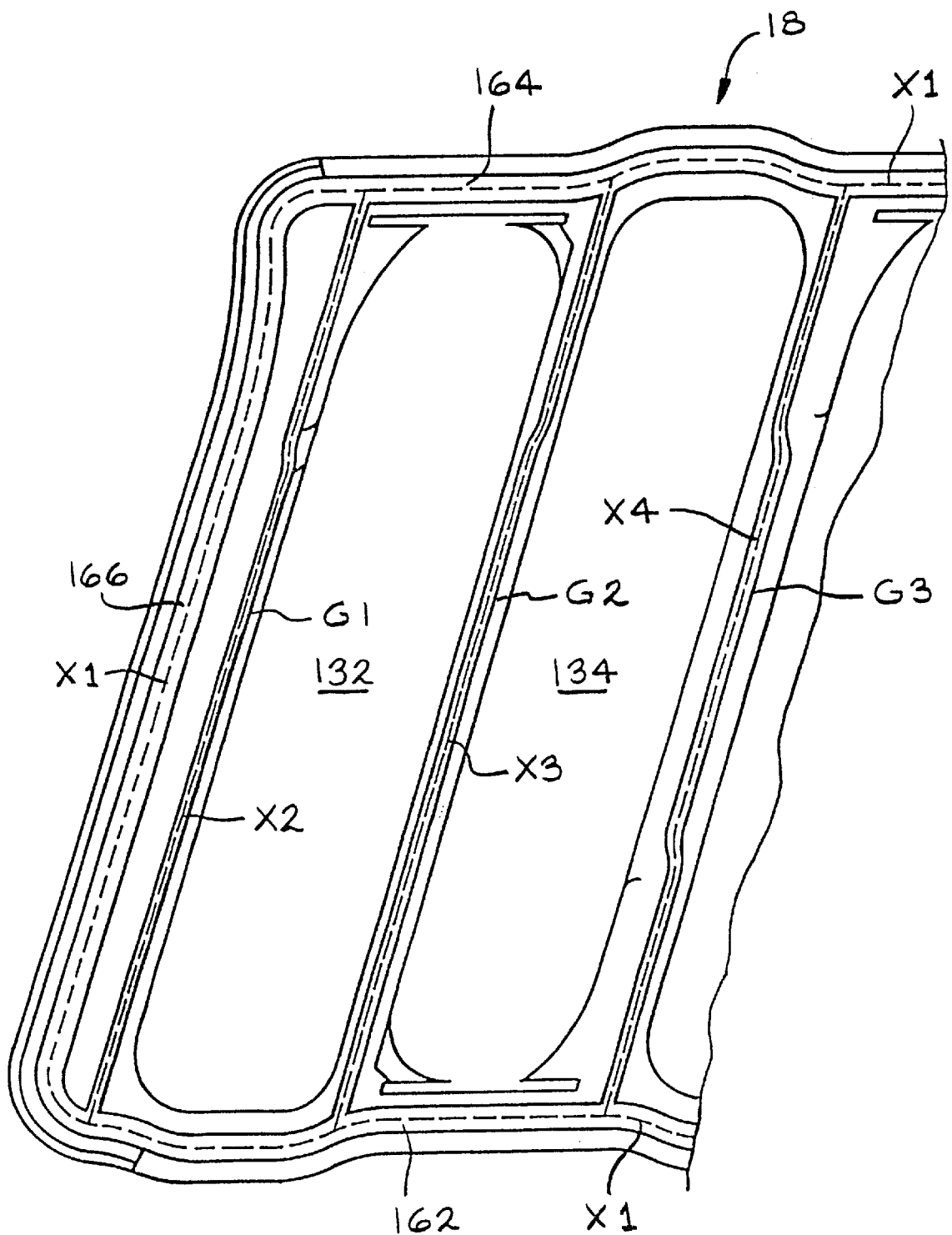
FIG. 3A is an enlarged plan view of a portion of the lower half shell shown in FIG. 3.

The lower half shell 18 includes an outer peripheral edge 160 which defines a pair of opposed side flanges 162 and 164 and a pair of opposed end flanges 166 and 168. As will be discussed below, the side flanges 162 and 164 and the end flanges 166 and 168 cooperate to define a continuous welding periphery or border around the edge 160 of the lower half shell 18 (partially shown in FIG. 3A by dashed line X1), for securing the lower half shell 18 to the one piece inner shell 16. As can be seen, in this embodiment the upper half shell welding periphery W1 and the lower half shell welding periphery X1 are generally the same. However, the welding peripheries W1 and X1 can be other than illustrated if desired. The lower half shell 18 further includes an opening 130 which is in fluid communication with the plenum 30 of the upper half shell 14. The lower half shell 18 further includes a plurality of receiving flanges G1–G9, shown in FIG. 3. As will be discussed below, each of the flanges G1–G9 of the lower half shell 18 are adapted to receive a corresponding one of a plurality of insertion flanges provided on the one piece inner shell 16.

Figure 8:
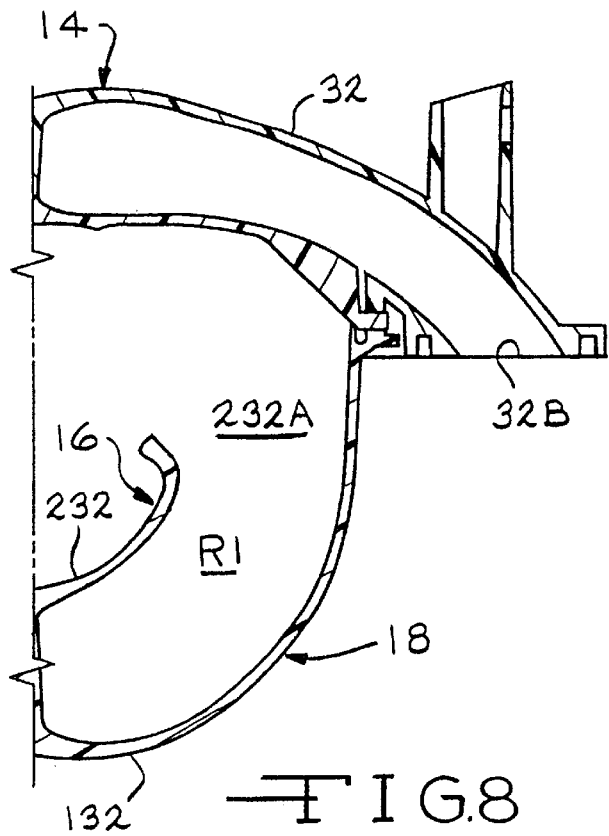
FIG. 8 is a sectional view of the composite intake manifold assembly taken along line 8—8 of FIG. 6.
Figure 9:
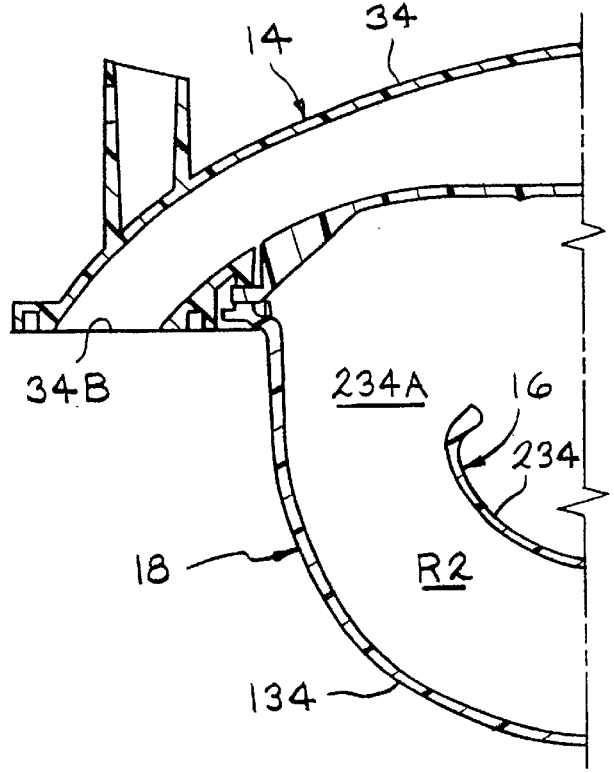
FIG. 9 is a sectional view of the composite intake manifold assembly taken along line 9—9 of FIG. 6.
Figure 13:
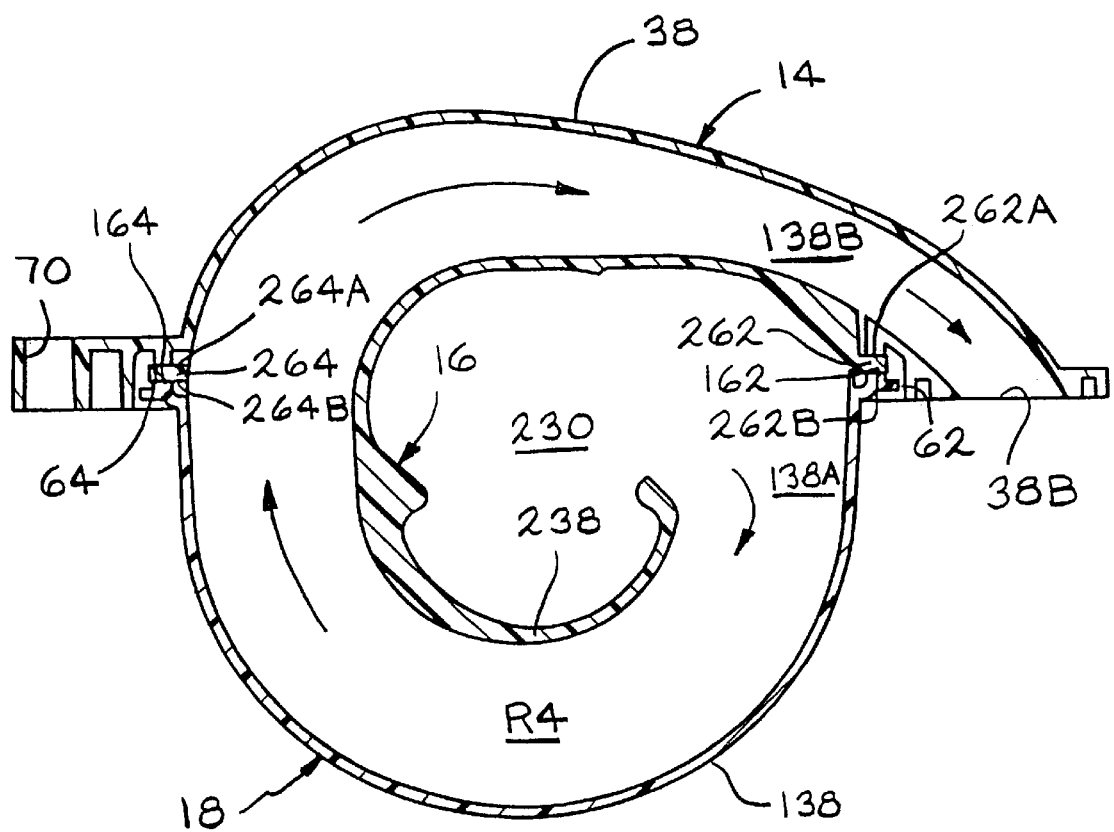
FIG. 13 is a sectional view of the composite intake manifold assembly taken along line 13—13 of FIG. 6.

In the illustrated embodiment, the one piece inner shell 16 is a one piece molded shell formed from a polymer material and includes eight generally tubular shaped runner centers 232, 234, 236, 238, 240, 242, 244, and 246. As will be discussed below, the one piece inner shell runner centers 232, 234, 236, 238, 240, 242, 244, and 246 in combination with the respective upper half shell runner inner wall surfaces 32A, 34A, 36A, 38A, 40A, 42A, 44A, and 46A and lower half shell runner inner wall surfaces 32A, 34A, 36A, 38A, 40A, 42A, 44A, and 46A define eight runners R1, R2, R3, R4, R5, R6, R7, and R8 (only one of such runners R4 is illustrated in detail in FIG. 13), of the composite intake manifold assembly 10. While only runner R4 is illustrated in detail in FIG. 13, it is understood that the other runners R1–R3 and R5–R8 are essentially the same as runner R4. FIG. 8 is a partial sectional view showing runner RI, and FIG. 9 is a partial sectional view showing runner R2 in detail.

The one piece inner shell 16 includes an outer peripheral edge 260 which defines a pair of opposed side flanges 262 and 264 and a pair of opposed end flanges 266 and 268. The side flange 262 includes an upper side flange surface 262A and a lower side flange surface 262B, and the side flange 264 includes an upper side flange surface 264A and a lower side flange surface 264B. The end flange 266 includes an upper end flange surface 266A and a lower end flange surface 267B, and the end flange 268 includes an upper end flange surface 268A and a lower end flange surface 268B.

Figure 10:
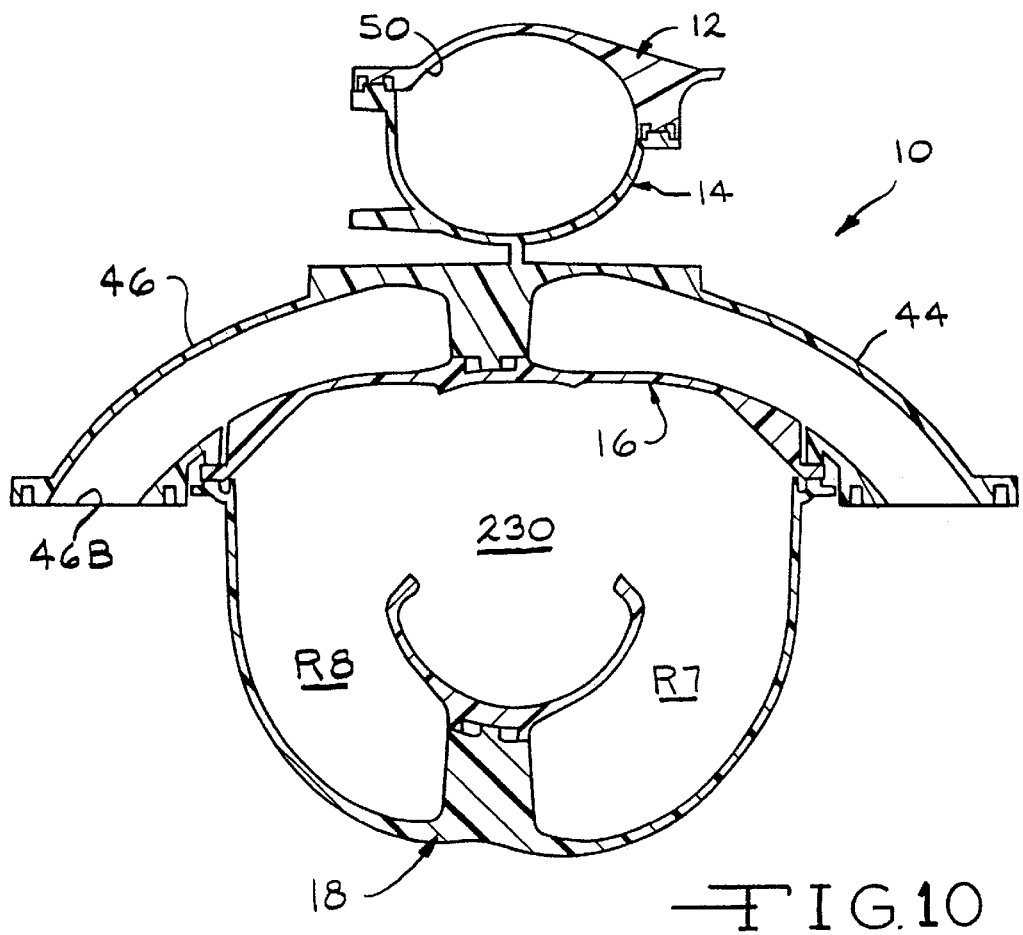
FIG. 10 is a sectional view of the composite intake manifold assembly taken along line 10—10 of FIG. 6.
Figure 11:
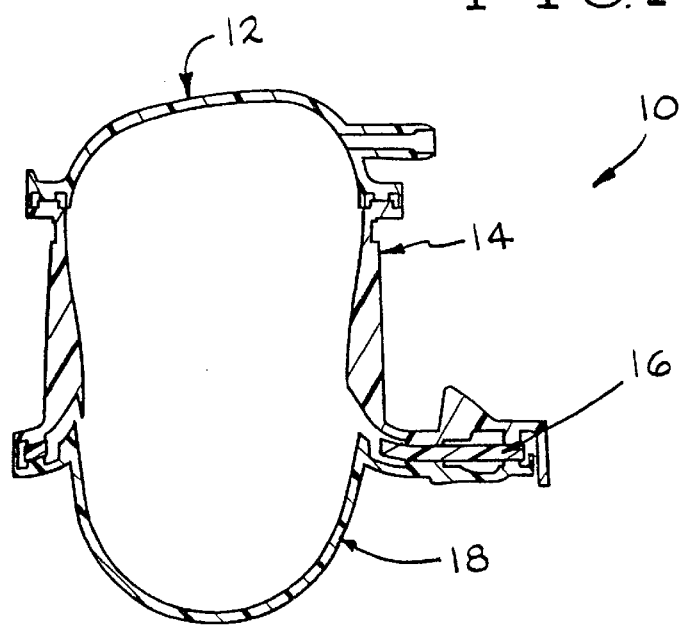
FIG. 11 is a sectional view of the composite intake manifold assembly taken along line 11—11 of FIG. 6.

As will be discussed below, the upper side flange surfaces 262A and 264A and the upper end flange surfaces 266A and 268A cooperate to define a continuous welding periphery or border around an upper edge 260 of the one piece inner shell 16 (partially shown in FIGS. 3A and 4A by dashed line Y1), for securing the one piece inner shell 16 to the upper half shell 114; and the lower side flange surfaces 262B and 264B and the lower end flange surfaces 266B and 268B cooperate to define a continuous welding periphery or border (not shown but similar to welding periphery shown by dashed line Y1 described above) around a lower edge 260 of the one piece inner shell 16 for securing the one piece inner shell 16 to the lower half shell 18. The one piece inner shell 16 further includes a main air collection chamber 230 which is operative to supply air from the plenum 30 to each of the runners R1, R2, R3, R4, R5, R6, R7, and R8 of the intake manifold assembly 10. In FIG. 10, the main air collection chamber 230 is shown supplying air to runners R7 and R8.

Each of the runner centers 232, 234, 236, 238, 240, 242, 244, and 246 includes a respective air intake port, indicated generally at 232A, 234A, 236A, 238A, 240A, 242A, 244A, and 246A, and a respective air outlet port, indicated generally at 232B, 234B, 236B, 238B, 240B, 242B, 244B, and 246B. The air intake ports 232A, 234A, 236A, 238A, 240A, 242A, 244A, and 246A are in fluid communication with the main air collection chamber 230, and the air outlet ports 232B, 234B, 236B, 238B, 240B, 242B, 244B, and 246B are in fluid communication with an associated one of the air inlet ports 32B, 34B, 366B, 38B, 40B, 42B, 44B, and 46B of the upper half shell 14.

Figure 4:
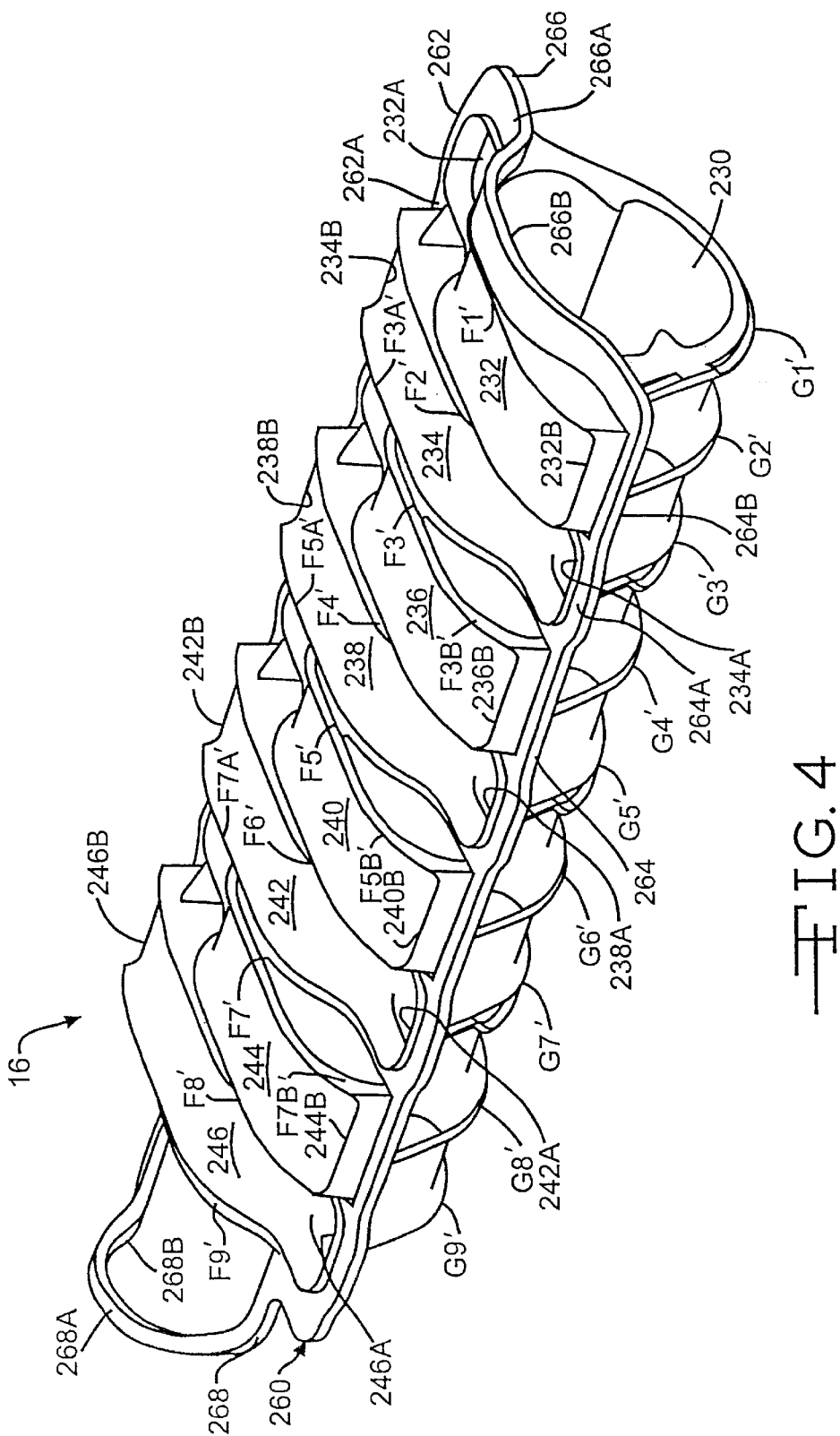
FIG. 4 is a perspective view of a one piece inner shell used in the composite intake-manifold assembly illustrated in FIG. 1.
Figure 4A:
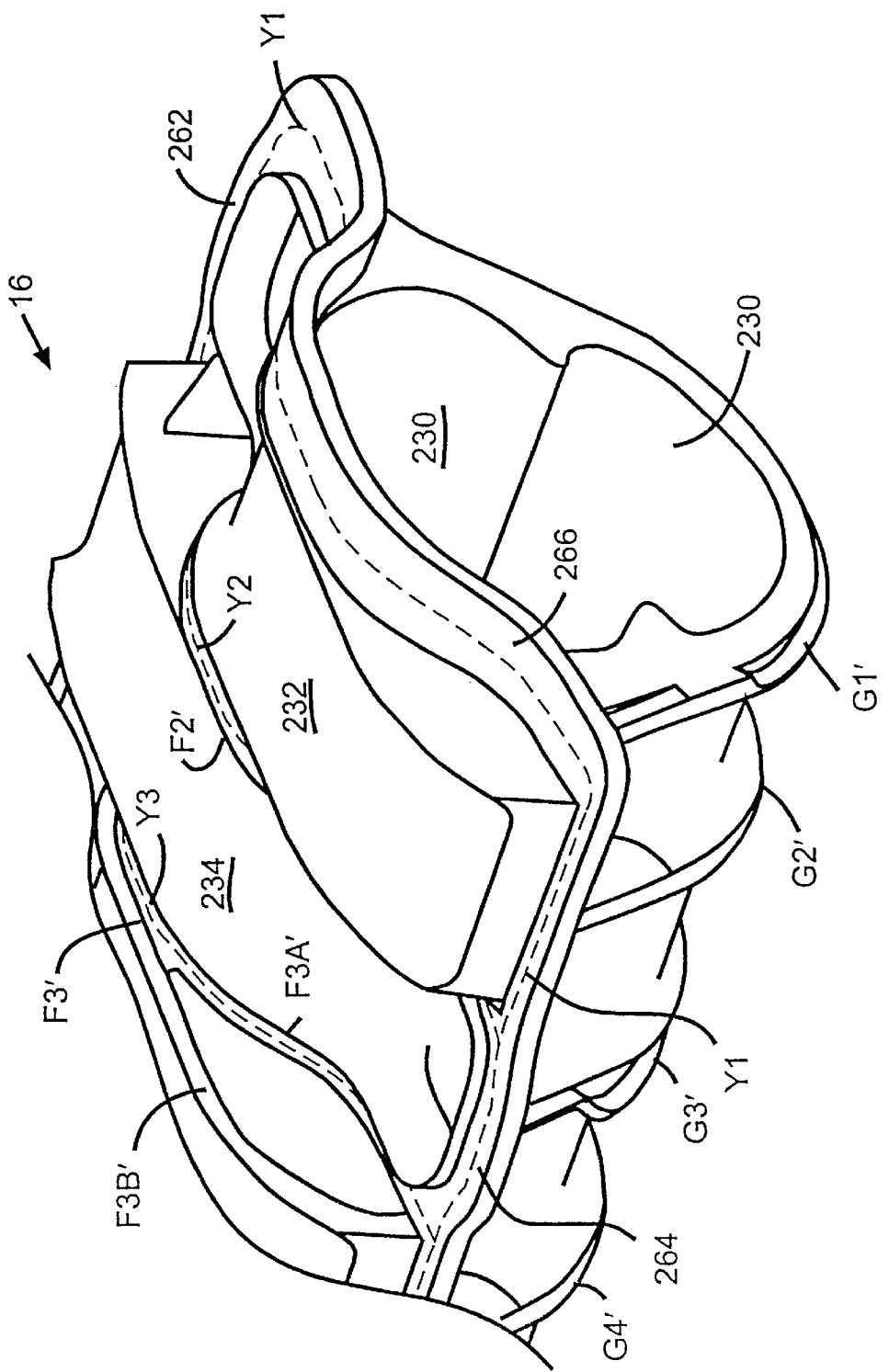
FIG. 4A is an enlarged view of a portion of the one piece inner shell shown in FIG. 4.
Figure 5:
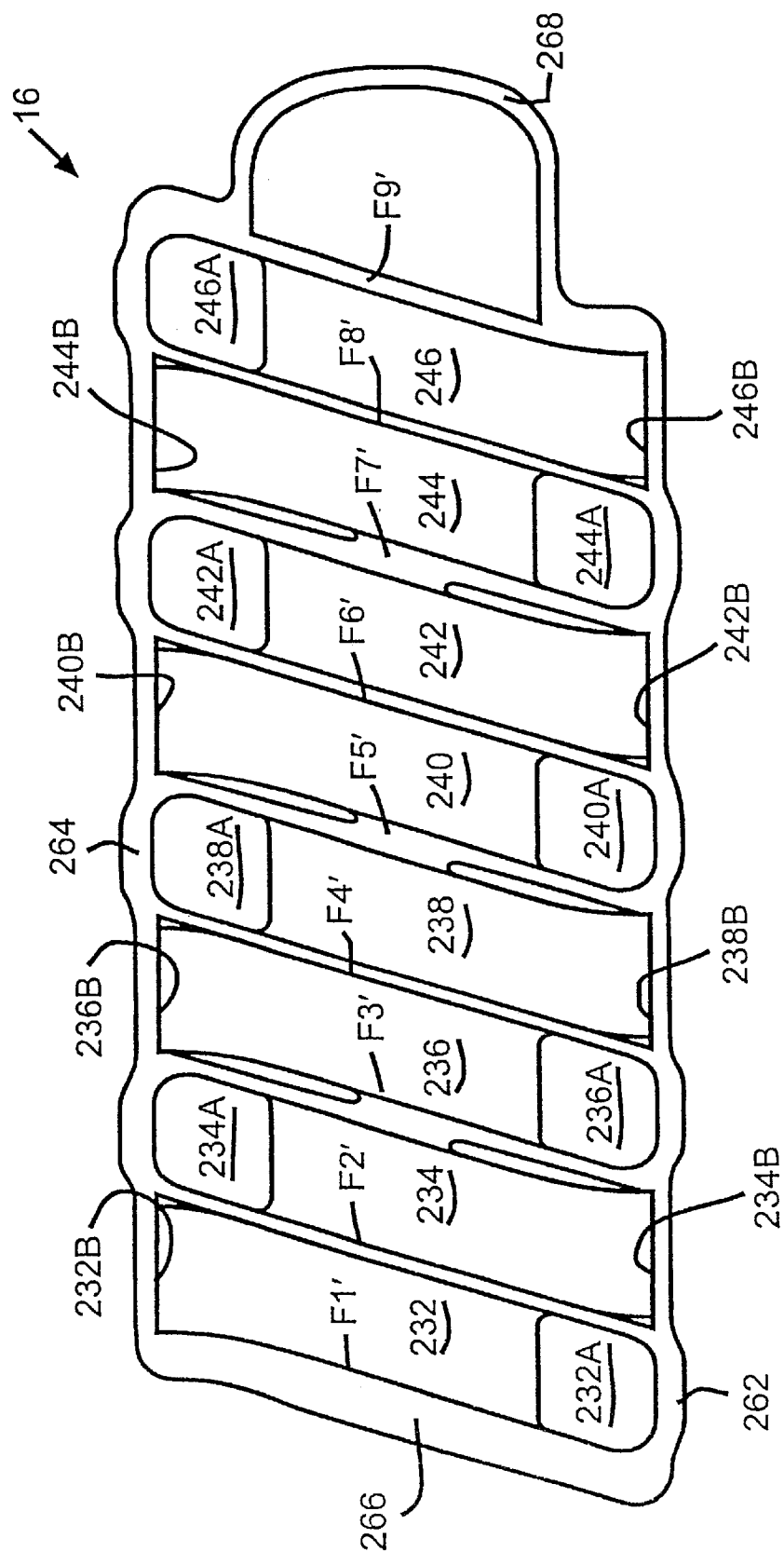
FIG. 5 is a plan view of the one piece inner shell illustrated in FIGS. 1 and 4.

The one piece inner shell 16 further includes a plurality of longitudinal insertion flanges F1'–F9' provided on the upper portion thereof, and a plurality of longitudinal insertion flanges G1'–G9' provided on the lower portion thereof. As best shown in FIGS. 4 and 5, the insertion flange F3' is defined by a portion of an insertion flange F3A' of runner center 234 and a portion of an insertion flange F3B' of runner center 236. Insertion flanges F5', F7', G3', G5', and G7' have a similar construction to that of insertion flange F3'. As will be discussed below, the insertion flanges F1'–F9' and G1'–G9' of the one piece inner shell 16 are adapted to be received into respective receiving flanges F1–F9 and G1–G9 of the upper half shell 14 and the lower half shell 18, shown in FIG. 7 and in FIG. 12. Alternatively, insertion flanges could be provided on the upper half shell 14 and the lower half shell 18 and receiving flanges adapted to receive such insertion flanges could be provided on the one piece inner shell 16.

To assemble the components together to produce the intake manifold assembly 10, the following process occurs. First, the cover 12 is positioned adjacent the upper half shell 14 by aligning the underside insertion flange 28 of the cover 12 with the receiving flange 54 of the upper half shell 14. Next, a linear vibration welding process is preferably used to permanently secure the cover 12 to the upper half shell 14. The weld used to secure the cover 12 to the upper half shell 14 is both a structural weld and a sealing flange.

Following this, the one piece inner shell 16 is properly positioned and aligned within the upper half shell 14 so that the side and end flanges 62, 64, 66, and 68 of the upper half shell 14 are disposed adjacent the respective upper side and end flanges 262A, 264A, 266A, and 268A of the one piece inner shell 16. In addition, the receiving flanges F1–F9 of the upper half shell 14 and the associated insertion flanges F1' F9' of the one piece inner shell 16 are disposed in a mating and/or interlocking relationship therewith.

Figure 5A:
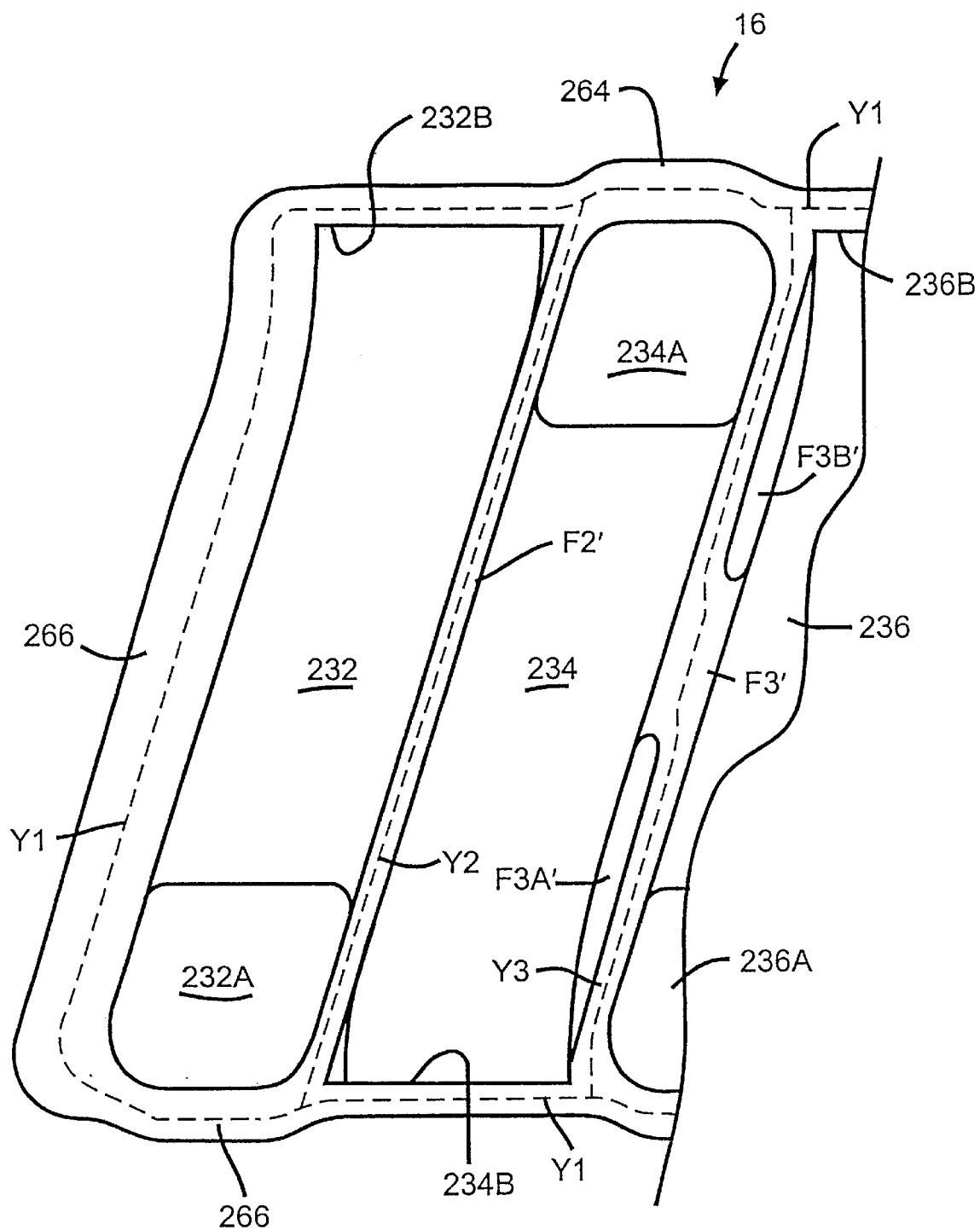
FIG. 5A is an enlarged plan view of a portion of the one piece inner shell shown in FIG. 5.

With the one piece inner shell 16 maintained in this position, preferably a vibration welding process is used to permanently secure the one piece inner shell 16 to the upper half shell 14. In particular, the upper half shell 14 and the one piece inner shell 16 are welded together along their associated weld planes or joints W1 and Y1 to provide a structural weld to join the components together and also to provide a "sealing" connection or weld between the components (welds W1 and Y1 partially shown in FIG. 2A and FIGS. 4A and 5A, respectively). In addition, the upper half shell 14 and the one piece inner shell 16 are welded along the F2–F9 and F2'–F9', respectively, to provide a sealing weld therebetween (only welds W2 and W3 of the upper half shell 14 at flanges F2 and F3 illustrated in FIG. 2A, and only welds Y2 and Y3 of the insert illustrated in FIGS. 4A and 5A). As a result, each of the individual runners R1–R8 in the upper half shell portion of the intake manifold assembly 10 is completely sealed off from fluid communication with an associated adjacent runner. While in this embodiment a weld is not illustrated at flanges F1 and F1', a weld can be provided along these flanges or along any other flanges depending upon the particular structure of the associated upper half shell 14 and one piece inner shell 16.

Next, the lower half shell 18 is properly positioned and aligned within the partially assembled air intake manifold assembly so that the side and end flanges 162, 164, 166, and 168 of the lower half shell 18 are disposed adjacent the respective lower side and end flanges 262B, 264B, 266B, and 268B of the one piece inner shell 16. In addition, the receiving flanges G1–G9 of the lower half shell 18 and the associated insertion G1' G9' of the one piece inner shell 16 are disposed in a mating and/or interlocking relationship therewith.

With the lower half shell 18 maintained in this position, preferably a vibration welding process is used to permanently secure the insert lower half shell 18 to the partly assembled air intake manifold assembly and to produce the air intake manifold assembly 10 of this invention. In particular, the lower half shell 18 and the one piece inner shell 16 are welded together along their associated weld planes or joints to provide a structural weld (only weld X1 of the lower half shell 18 illustrated in FIG. 3A) to join the components together and also to provide a "sealing" weld between the components. In addition, the lower half shell 18 and the one piece inner shell 16 are welded or otherwise connected along the flanges G1–G9 and G1'–G9', respectively, to provide a sealing weld therebetween (only welds X2, X3 and X4 of the lower half shell 18 at flanges G1, G2 and G3 illustrated in FIG. 2A, no welds shown for one piece inner shell 16 but are similar to those welds Y2 and Y3 of the one piece inner shell 16 illustrated in FIGS. 4A and 5A). As a result, each of the individual runners R1–R8 in the lower half shell portion of the intake manifold assembly 10 is completely sealed off from fluid communication with an associated adjacent runner. Alternatively, if it is not desired to seal off a runner from an associated adjacent runner, or if a different type of insert is used (as will be discussed below in connection with FIG. 14), or if no insert is used at all, only the "structural" weld along the associated flanges 62, 64, 66, 68 and 162, 164, 166, and 168 of the upper half shell 14 and the lower half shell 18 may be needed. Also, the structure of the receiving flanges F1–F9 and G1–G9 of the upper half shell 14 and the lower half shell 18, respectively, and/or the structure of the insertion flanges F1'–F9' and G1'–G9' of the one piece inner shell 16 can be other than illustrated if desired. If however it is desired to prevent air leakage from adjacent runners, the structure of such flanges should be such that they are in relatively close proximity with one another to allow them to be joined together to provide a seal therebetween.

As discussed above, FIG. 13 illustrates runner R4 in detail. As shown therein, runner R4 functions to supply air from main chamber 230, to air inlet port 138A, in the direction of the arrows, to air outlet port 138B, and to air inlet port 38B. Also, since the runner center 234 of the one piece inner shell 16 is sealed along all adjacent surfaces of the upper half shell 14 and the lower half shell 18, all the air entering runner R4 from port 138A is supplied to port 38B without any air leakage to the adjacent runners R3 and R5. Thus, a "360 degree" wrap weld joint is created in runner R4, as well as the other runners R1–R3 and R5–R8. The term 360 degree wrap weld joint as used herein refers to the fact that the associated runner is completely sealed around its entire arch shaped path from an adjacent runner, the path being defined from the air inlet port of the runner to the associated air outlet port thereof in a generally full circular path (i.e., a 360 degree like path). As a result, there is no air leakage from one runner to an adjacent runner, and the air supplied to each associated cylinder head is maintained uniform.

Figure 14:
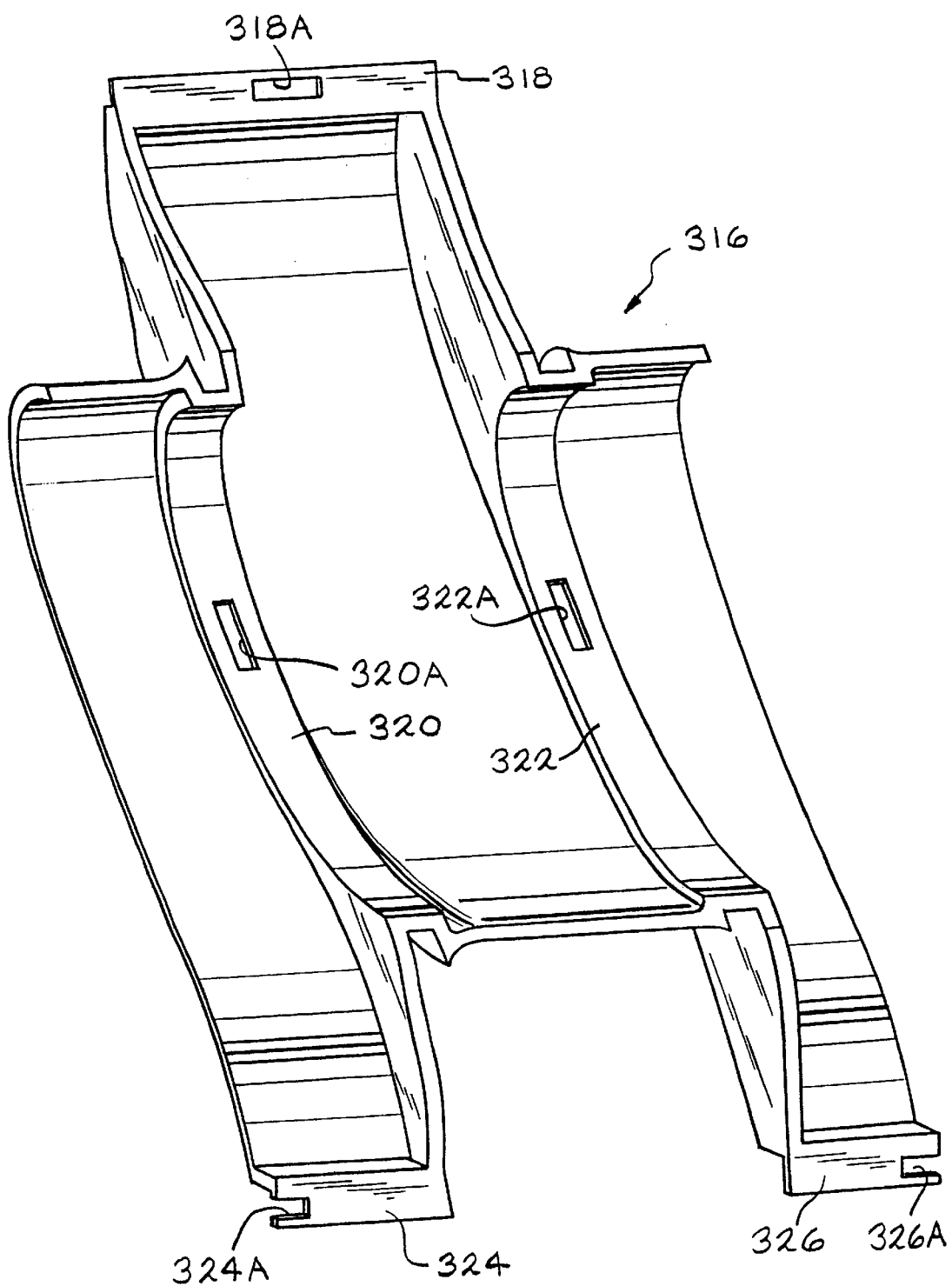
FIG. 14 is a perspective view of an alternate embodiment of a partial inner shell which can be used in connection with the present invention.

FIG. 14 illustrates an alternate embodiment of a partial inner shell or insert, indicated generally at 316, which can be used in place of the one piece full inner shell 16. The partial inner shell 316 includes flanges 318, 320, 322, 324, and 326. The flanges 318, 320, 322, 324, and 326 are provided with respective openings 318A, 320A, 322A, 324A, and 326A. The openings 318A, 320A, and 322A are operative to enable the partial inner shell 316 to be joined to the associated upper half shell 14 or lower half shell 18 by an appropriate method, such as for example, by heat staking. The openings 324A and 326A are operative to enable additional inserts (not shown) to be connected to the partial inner shell 316. The number of partial inner shells 316 which are used is dependent upon the particular vehicle application.

One advantage of the air intake manifold assembly 10 illustrated in FIGS. 1–13 is that the runners R1–R8 are completely sealed off from fluid communication with each adjacent runner to prevent air leakage from one runner to an adjacent runner. As a result of this, the air supplied to each associated cylinder head from the air intake manifold assembly 10 of this invention is maintained at a desired generally constant flow rate. Another advantage of the air intake manifold assembly 10 illustrated in FIGS. 1–13 is that the one piece inner shell 16 can be formed for a variety of different vehicle engine applications. As a result of this, various runner lengths and plenum volumes can be attained by only modifying the one piece inner shell 16 of the present invention. Yet another advantage of this invention is that the one piece inner shell 16 allows a generally arch shaped runner with a greater than 180 degrees wrap. Still a further advantage of the air intake manifold assembly 10 of this invention is that a generally "straight" weld is used to connect the side flanges 62 and 162 and 64 and 164 of associated upper half shell 14 and the lower half shell 18. This straight weld can be used with the one piece full inner shell 16 illustrated in FIGS. 1, 4, 4A, 5, 5A, and 7–13, the insert 316 illustrated in FIG. 14, or with no inner shell at all. In addition, a straight weld could be used to connect the side flanges 62 and 162 and 64 and 164, and a separate structural and/or sealing weld could be used with the inner shell or inner shells. In either of the above structures, as a result of this generally straight weld, the associated "burst pressure strength" of the air intake manifold assembly 10 is increased. Thus, the air intake manifold assembly 10 of this invention can eliminate the need of providing a costly blow off safety valve. Still a further advantage of the air intake manifold assembly 10 of this invention is that the upper half shell 14 includes an integrally molded in place mounting bracket 80, sensor fitting connection 82, and vacuum taps 20 and 22. As a result of this, the costs associated with the brass fitting typically used for the connection and taps can be eliminated.

In accordance with the provisions of the patents statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A composite air intake manifold assembly adapted for use with an internal combustion engine comprising:
   an upper half shell formed from a polymer;
   a lower half shell formed from a polymer and joined to said upper half shell by a welding process to define a housing having an internal cavity; and
   a one piece inner shell formed from a polymer and disposed within said cavity, said inner shell in combination with said upper half shell and said lower half shell cooperating to define at least a pair of spaced apart air intake runners, each of said runners including an opened air intake end, adapted to receive atmospheric air, and an opened air inlet end, adapted to be connected to an associated air inlet side of a cylinder head of the internal combustion engine;
   wherein said inner shell includes an outer peripheral edge extending around an entire portion thereof which defines a continuous flange around an entire portion of a periphery thereof and which is adapted to be used in joining said inner shell, said upper half shell and said lower half shell together during a welding process.

2. The composite air intake manifold assembly defined in claim 1 wherein said one piece inner shell includes at least two generally tubular shaped runner centers which in combination with an inner runner wall surface of said upper half shell and an inner wall surface of said lower half shell cooperate to define at least a pair of spaced apart generally tubular shaped air intake runners.

3. The composite air intake manifold assembly defined in claim 1 wherein said one piece inner shell includes an outer peripheral edge which defines a pair of opposed side flanges and a pair of opposed end flanges, each of said side flanges including an upper side flange surface and a lower side flange surface, each of said end flanges including an upper end flange surface and a lower end flange surface, said upper side flange surfaces and said upper end flange surfaces defining a continuous welding periphery around an upper edge of said one piece inner shell for joining said one piece inner shell to said upper half shell, and said lower side flange surfaces and said lower end flange surfaces defining a continuous welding periphery around a lower edge of said one piece inner shell for joining said one piece inner shell to said lower half shell.

4. The composite air intake manifold assembly defined in claim 1 wherein said one piece inner shell includes a plurality of insertion flanges provided on the upper portion thereof, and a plurality of insertion flanges provided on the lower portion thereof, said upper half shell includes a plurality of receiving flanges, said lower half shell includes a plurality of receiving flanges, and said insertion flanges of said inner shell are adapted to be received into said receiving flanges of said upper half shell and said lower half shell in a mating relationship therewith so as to properly position and align said upper half shell, said one piece inner shell, and said lower half shell relative to one another.

5. The composite air intake manifold assembly defined in claim 1 wherein said one piece inner shell includes a plurality of receiving flanges provided on the upper portion thereof, and a plurality of receiving flanges provided on the lower portion thereof, said upper half shell includes a plurality of insertion flanges, said lower half shell includes a plurality of insertion flanges, and said receiving flanges of said inner shell are adapted to receive said insertion flanges of said upper half shell and said lower half shell in a mating relationship therewith so as to properly position and align said upper half shell, said one piece inner shell, and said lower half shell relative to one another.

6. The composite air intake manifold assembly defined in claim 1 wherein said one piece inner shell in combination with said upper half shell and said lower half shell cooperating to define eight spaced apart air intake runners adapted for use with a V-8 internal combustion engine application, each of said runners including an opened air intake end, adapted to receive atmospheric air, and an opened air inlet end, adapted to be connected to an associated air inlet side of a cylinder head of the V-8 internal combustion engine.

7. A method for producing a composite air intake manifold assembly adapted for use with an internal combustion engine comprising the steps of:
   (a) providing an upper half shell formed from a polymer;
   (b) providing a lower half shell formed from a polymer;
   (c) providing a one piece inner shell formed from a polymer, the inner shell including an outer peripheral edge extending around an entire portion thereof which defines a continuous flange around an entire portion of a periphery thereof and which is adapted to be used in joining the inner shell, the upper half shell and the lower half shell together;
   (d) disposing the one piece inner shell in a cavity defined by the upper half shell and the lower half shell when disposed adjacent one another; and
   (e) joining the one piece inner shell, the upper half shell and the lower half shell together by a welding process wherein the one piece inner shell in combination with the upper half shell and the lower half shell cooperate to define at least a pair of spaced apart air intake runners, each of the runners including an opened air intake end, adapted to receive atmospheric air, and an opened air inlet end, adapted to be connected to an associated air inlet side of a cylinder head of the internal combustion engine.

8. The method according to claim 7 wherein the one piece inner shell includes at least two generally tubular shaped runner centers which in combination with an inner runner wall surface of said upper half shell and an inner wall surface of said lower half shell cooperate to define at least a pair of spaced apart generally tubular shaped air intake runners.

9. The method according to claim 7 wherein the one piece inner shell includes an outer peripheral edge which defines a pair of opposed side flanges and a pair of opposed end flanges, each of said side flanges including an upper side flange surface and a lower side flange surface, each of said end flanges including an upper end flange surface and a lower end flange surface, the upper side flange surfaces and said upper end flange surfaces defining a continuous welding periphery around an upper edge of said one piece inner shell for joining said one piece inner shell to said upper half shell, and said lower side flange surfaces and said lower end flange surfaces defining a continuous welding periphery around a lower edge of said one piece inner shell, and during step (e) the upper half shell, the lower half shell, and the one piece inner shell are joined together by welding along the welding peripheries.

10. The method according to claim 7 wherein the one piece inner shell includes a plurality of insertion flanges provided on the upper portion thereof, and a plurality of insertion flanges provided on the lower portion thereof, the upper half shell includes a plurality of receiving flanges, the lower half shell includes a plurality of receiving flanges, and prior to step (e), the insertion flanges of the inner shell are received into the receiving flanges of the upper half shell and the lower half shell in a mating relationship therewith so as to properly position and align the upper half shell, the one piece inner shell, and the lower half shell relative to one another.

11. The method according to claim 7 wherein the one piece inner shell includes a plurality of receiving flanges provided on the upper portion thereof and a plurality of receiving flanges provided on the lower portion thereof, the upper half shell includes a plurality of insertion flanges, the lower half shell includes a plurality of insertion flanges, and prior to step (e), the receiving flanges of the inner shell receive the insertion flanges of the upper half shell and the lower half shell in a mating relationship therewith so as to properly position and align the upper half shell, the one piece inner shell, and the lower half shell relative to one another.

12. The method according to claim 7 wherein the one piece inner shell in combination with the upper half shell and the lower half shell cooperate to define eight spaced apart air intake runners adapted for use with a V-8 internal combustion engine application, each of the runners including an opened air intake end, adapted to receive atmospheric air, and an opened air inlet end, adapted to be connected to an associated air inlet side of a cylinder head of the V-8 internal combustion engine.

13. A method for producing a composite air intake manifold assembly adapted for use with an internal combustion engine comprising the steps of:

(a) providing an upper half shell formed from a polymer;

(b) providing a lower half shell formed from a polymer;

(c) providing a one piece inner shell formed from a polymer, the inner shell including an outer peripheral edge extending around an entire portion thereof which defines a continuous flange around an entire portion of a periphery thereof and which is adapted to be used in joining the inner shell, the upper half shell and the lower half shell together during a welding process;

(d) disposing the one piece inner shell in one of the lower half shell and the upper half shell;

(e) subsequent to step (d), joining the one piece inner shell to the one of the lower half shell and the upper half shell by a welding process; and (f) joining the one piece inner shell to the other one of the lower half shell and the upper half shell by a welding process to thereby produce the composite air intake manifold assembly, wherein the one piece inner shell in combination with the upper half shell and the lower half shell cooperate to define at least a pair of spaced apart air intake runners, each of the runners including an opened air intake end, adapted to receive atmospheric air, and an opened air inlet end, adapted to be connected to an associated air inlet side of a cylinder head of the internal combustion engine.

14. The method according to claim 13 wherein step (e) and step (f) are done simultaneously with one another.

* * * * *